United States Patent [19]
Cave et al.

[11] Patent Number: 5,581,553
[45] Date of Patent: Dec. 3, 1996

[54] DISTRIBUTED SWITCHING ARCHITECTURE

[75] Inventors: Ellis K. Cave, Garland; George A. Elwell, Mesquite; Michael J. Polcyn, Allen, all of Tex.

[73] Assignee: InterVoice Limited Partnership, Reno, Nev.

[21] Appl. No.: 108,320

[22] Filed: Aug. 18, 1993

[51] Int. Cl.⁶ .................................................. H04Q 11/04
[52] U.S. Cl. .......................................... 370/362; 370/364
[58] Field of Search ........................... 370/67, 58.1, 60, 370/85.1, 77, 85.9, 92, 58.2, 58.3, 60.1, 94.1, 94.2, 85.4, 85.5, 85.12, 85.13, 85.14, 85.7, 95.3

[56] References Cited

U.S. PATENT DOCUMENTS

| | | | |
|---|---|---|---|
| 3,566,038 | 2/1971 | Slavin | 370/85.1 |
| 3,921,137 | 11/1975 | McClearn, Jr. et al. | 370/85.7 |
| 4,574,378 | 3/1986 | Kobayashi | 370/95.3 |
| 4,661,951 | 4/1987 | Segarra | 370/85.9 |
| 4,763,319 | 8/1988 | Rozenblit | 370/85.7 |
| 4,821,263 | 4/1989 | Lundh | 370/85.1 |
| 4,975,903 | 12/1990 | Wakerly et al. | 370/67 |
| 4,980,886 | 12/1990 | Bernstein | 370/95.3 |
| 5,151,896 | 9/1992 | Bowman et al. | 370/67 |
| 5,175,866 | 12/1992 | Childress et al. | 370/58.3 |
| 5,184,348 | 2/1993 | Abdelmouttalib et al. | 370/85.7 |
| 5,193,090 | 3/1993 | Filipiak et al. | 370/85.1 |
| 5,193,110 | 3/1993 | Jones et al. | 379/94 |
| 5,247,519 | 9/1993 | Snowden et al. | 370/94.1 |
| 5,274,634 | 12/1993 | Babiarz | 370/67 |
| 5,276,678 | 1/1994 | Hendrickson et al. | 370/85.1 |
| 5,280,477 | 1/1994 | Trapp | 370/85.1 |
| 5,353,285 | 10/1994 | Van Der Plas et al. | 370/85.7 |
| 5,363,373 | 11/1994 | Nakahara et al. | 370/95.3 |

*Primary Examiner*—Douglas W. Olms
*Assistant Examiner*—Shick Hom
*Attorney, Agent, or Firm*—Fulbright & Jaworski L.L.P.

[57] ABSTRACT

A system and method is disclosed for linking remote telecommunications ports connected to remote nodes wherein the functionality of a centralized switching system is distributed among the remote nodes. A multichannel bus couples the remote nodes to each other. In a preferred embodiment, the transmit channels of selected remote ports are permanently assigned to specified channels within the bus while the receive channels of the remote ports are permitted to float between all of the bus channels. In this distributed architecture, each node may receive a request from an associated port for a connection to another port. Each node is capable of performing the switching connections locally resulting in less message protocol being passed between nodes.

42 Claims, 5 Drawing Sheets

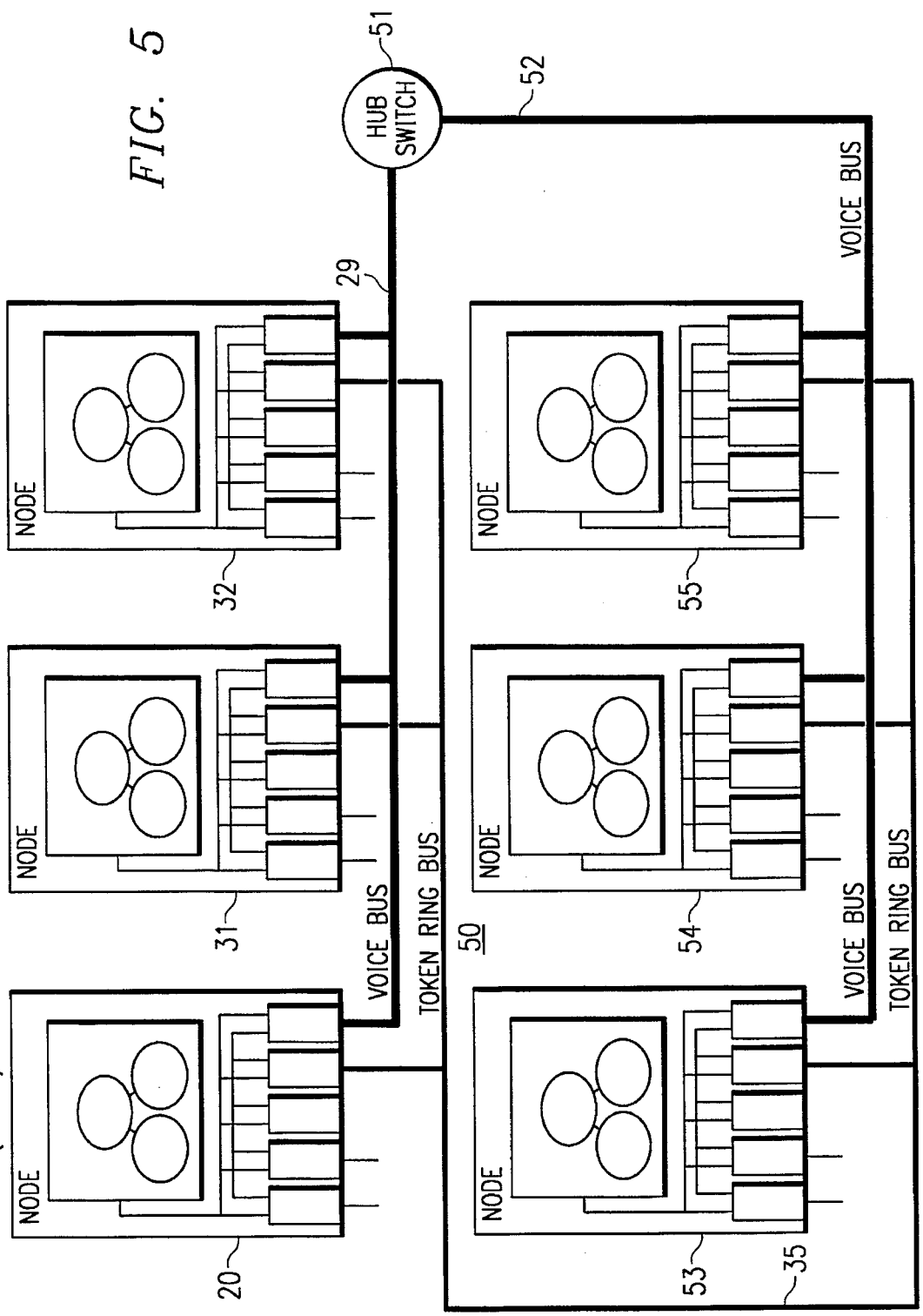

DISTRIBUTED SWITCHING ARCHITECTURE

CROSS REFERENCE

Patent application Ser. No. 08/016,740 now U.S. Pat. No. 5,479,487, entitled "Call Center," assigned to a common assignee is hereby incorporated by reference herein.

Co-pending patent application Ser. No. 08/016,062 entitled "Method and System for Unified Voice Telephone Services," assigned to a common assignee is hereby incorporated by reference herein.

TECHNICAL FIELD OF THE INVENTION

This invention relates in general to telecommunications switching systems and, more particularly, to a distributed switching architecture whereby all switching functionality is distributed within and among nodes.

BACKGROUND OF THE INVENTION

In a conventional centralized telecommunications switching architecture, the entire system and its functionality are centralized in one location. Telecommunications devices, such as telephones, computers and facsimile machines, are generally remotely located and are connected to ports within the central switch by transmission lines, or their equivalent, coupled to the devices' transmit and receive channels.

If a process coupled to the central switch wishes to connect two devices, or if a device wishes to communicate with another remote device, a request is sent to the central switch which determines the availability of the remote device(s). If both remote devices are available, the central switch couples the first device's transmit channel to the second device's receive channel and vice versa. These connections are performed at the central switch.

One example of a central switch is a local PBX. Often an organization with a growing work force or customer base requires a locally installed PBX in order to have a more efficient communication network for accommodating the work force and/or the customer base.

Such a PBX can be additionally coupled to an integrated services system such as the system disclosed within U.S. Pat. No. 5,193,110 to Jones et al., which is hereby incorporated by reference herein. Such a PBX-based system can provide interconnections to a plurality of ports or devices providing different types of information services. Other PBX-based systems that traditionally utilize a centrally located PBX are automated call distribution ("ACD") systems, predictive dialing systems and voice mail systems.

However, the initial investment for an organization to install such a PBX or PBX-based system may be prohibitive and expensive, especially if the PBX's potential capacity far exceeds the number of devices or ports initially served. In such a situation, the initial capital expenditure to install the underutilized PBX or PBX-based system may not be recouped for quite some time. An option would be to invest in a smaller PBX-based system and upgrade to a larger system as the need arises. In the long run, this may prove more costly both in money and time.

Another disadvantage to a central switch or a centralized integrated services system is that upon a system or power failure, all ability to provide communications disappears since all of the switching functionality is centralized in one location.

Thus, what is needed in the art is a distributed switching architecture whereby a switching system or integrated services system may be implemented in stages in order to minimize capital expenditures and to grow the system as the need arises.

There is also needed in the art a switching system or integrated services system that will not become entirely inoperative upon the occurrence of a system or power failure.

SUMMARY OF THE INVENTION

The present invention is for a distributed switching architecture for a telecommunications network whereby the functionality embodied in a traditional centralized switch is dispersed among nodes within the network. Each node has the capability to interconnect the transmit and receive channels of a plurality of associated telecommunications ports and devices. The linkages to the devices and ports may be analog or digital. The digital linkage to external devices may, for example, consist of T1 data streams. The ports may connect to external devices such as telephones, computers and facsimile machines, or to other networks or switching systems. Nodes may also be coupled to devices internal to the system. Within this disclosure, "device" will be considered synonymous with "port."

Each node independently contains the capability to provide switching between ports and devices. Such a capability may comprise a means for receiving a request from one device for a linkage with a second device, means for processing the request, means for determining the location of the second device and means for linking the two devices together. Alternatively, the request for the linkage may originate as a command from a separate process running within the system or external to the system.

The nodes may be coupled to thereby enable a port associated with a first node to communicate to a port associated with a second node. The means for coupling the nodes may be accomplished with a digital bus having a preselected capacity. The bus may contain a preselected number of channels, or time slots in the case of a digital data stream running at a preselected frequency, whereby each port or device within the network may have its transmit and receive channels coupled thereto.

In such a configuration, when a request or command is received for a linkage between a first port associated with a first node to a second port, means within the first node receives the request, processes it, and determines the location of the requested second port. If the second port is contained in or associated with the first node, the processing means within the first node will send a message to the connection means located within the first node to link the two ports together. This may be accomplished by an internal bus.

If the second port is associated with a second node, the first node will receive and process the request as before, except that now it will note that the second port is associated with a remote (second) node. In the manner to be described, the first node may then assign the transmit and receive channels of the first port to separate channels within the bus. A message will be sent to the second port to direct its connection means to couple the second port's receiver to the bus channel assigned to the first port's transmit channel and to couple the second port's transmitter to the bus channel assigned to the first port's receive channel.

In a preferred embodiment of the invention, the bus may be configured so that the transmit channels from selected ports are permanently assigned to channels, or time slots, within the bus. The receive channels from selected ports are not permanently assigned and can be connected to any of the bus channels. Consequently, in this configuration any port may listen to any other port's transmit by coupling its assignable receive channel to the bus channel assigned to the other port's fixed transmit channel. Additionally, a plurality of ports may couple their receive channels to one port's transmit channel to provide "broadcast" capabilities.

As a node and/or port (device) is added to the system, each node within the system is informed of the addition. Thus, at all times, each node is aware of every bus channel assignment so that connection related messaging is directed to the correct destinations. The information regarding new additions of nodes and/or ports may be distributed among the nodes manually or automatically through system software.

An example of a typical operation of this preferred embodiment begins with a request by a first device (whether internal to the system or an external device coupled through a port) associated with a first node for a connection to a second device associated with a second node. The first node's control means will receive the request and a processing means will process the request and determine the location of the second device, including its bus channel assignment. If the request is for a two-way communication between the two devices, the processing means will send a message to a connection means within the first node to couple the first device's receive channel to the bus channel permanently assigned to the second device's transmit channel. A second message is sent directly to the second node requesting its processing means to couple the receive channel of the second device to the bus channel permanently assigned to the transmit channel of the first device. Such a message may be sent over the same bus containing the channels, or the message may be sent over a separate link, such as a token ring bus, linking all the nodes within the network.

If the request is for a one-way communication, for example where one transmitting device (internal or external) is broadcasting to a plurality of remote receiving devices, a first receiving device makes a request for the connection, which is processed by the first node associated with the first receiving device. The processing means determines the location of the requested transmitting device, including its bus channel assignment. If the transmitting device is associated with a second node, the processing means within the first node will couple the receive channel of the first receiving device to the bus channel permanently assigned to the transmit channel of the transmitting device. No message is required to be sent to the second node since this communication is one-way. Additionally, several devices may couple their receive channels to the assigned bus channel resulting in a broadcast from the transmitting device to the receiving devices.

Alternatively, the aforementioned requests may be instigated by a separate process residing somewhere in the system or external to it. This separate process would communicate to the connection processes residing within the nodes associated with the first and second devices in order to make the connection. Such a separate process, for example, could be a computer program operating to interconnect ports, or a robotic operator services system such as the one disclosed within the aforementioned patent application, Ser. No. 08/016,740.

If the individual capacities of certain nodes need to be increased, one or more additional buses may be added between the affected nodes. Furthermore, a single bus's bandwidth may be expanded by adding fiber optic cable resulting in a substantial increase in capacity to carry channels between the nodes.

The external bus between various nodes within the system may be of a larger bandwidth than internal buses within each of the nodes. For example, the external bus could be from two to ten times larger than the internal buses. The bandwidth of the external bus between nodes determines the maximum non-blocking switching capacity of a multi-node system.

In yet another preferred embodiment of the present invention, two levels of switching capabilities are provided to thereby provide a further distribution of the switching function. Within each node, an internal voice bus provides the capability for interconnections between devices within the node or between a device and an external device connected through a port within the node, or an interconnection between external devices connected through separate ports within the node. The various switching functions are performed solely within the individual nodes, and may originate from a particular internal or external device or from application software running within the particular node. The individual nodes are interconnected by an external voice bus that has a greater capacity than each of the internal voice buses within each node. Each internal voice bus is connected to the external voice bus. Thus, devices and/or ports associated with separate nodes may be interconnected. The switching functions associated with such interconnections are performed within the nodes associated with the devices and/or ports to be interconnected.

A technical advantage of the preferred embodiment of the invention is that all the functions of a conventional centralized switching system are distributed among the various nodes within the network, yet if less than all of the nodes fail, the network is still able to provide switching between unaffected nodes and associated ports and devices. Additionally, the network may be expanded in increments by simply adding a node.

Another technical advantage of the present invention is the ability to provide quick interconnections between ports and devices without employing a prolonged set of protocol, or "hand shaking," before connections may be completed. Generally, the present invention requires only one message to be sent between remote nodes since all nodes are aware of each permanent assignment of device (port) transmit channels to the interconnecting bus.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates using a hub switch to interconnect a plurality of multinode distributed switching systems.

DETAILED DESCRIPTION OF THE INVENTION

Figure 1:
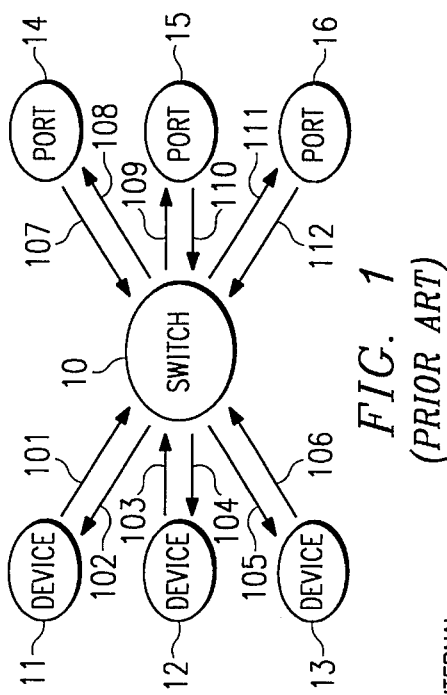
FIG. 1 illustrates a diagram of a conventional prior art centralized switching model.

Referring to FIG. 1, there is illustrated a diagram of a conventional prior art centralized switching architecture. Centralized switch 10 is linked to various telecommunications devices 11, 12 and 13 and ports 14, 15 and 16. The linkages may be accomplished by various well known methods and may be digital or analog in their nature. Devices 11, 12 and 13 and ports 14, 15 and 16 have both their transmit pathways 101, 103, 106, 107, 110 and 112, respectively, and their receive pathways 102, 104, 105, 108, 109 and 111, respectively, connected to centralized switch 10.

Ports 14, 15 and 16 may be coupled to external telecommunications devices, such as telephones, facsimile machines, modems, computers, or other networks. Devices 11, 12 and 13 are internal to the system within which the switch resides. Such devices may be fax cards, modem cards or other peripherals within a computer system, E-mail, or a "hold" message application program residing within an integrated services system.

In the conventional centralized switching architecture, if device 11 wishes to communicate with port 16, a request for such a communication will be sent by device 11 to centralized switch 10, which will then process the request. Switch 10 will determine the availability of port 16 and will send a signal over transmit pathway 111 to port 16 informing port 16 of the request by device 11. Note, however, that signalling may or may not be part of the function of switch 10. Additionally, signalling may or may not be passed down the audio path, which in this instance is transmit pathway 111 (inband signalling). Instead, a process, such as an applications program within an integrated services platform, may request the linkage between port 16 and device 11.

Upon a response by port 16 to the transmitted signal, or upon a command issued by the applications program or process, centralized switch 10 will then connect transmit pathway 101 of device 11 to receive pathway 111 of port 16 and connect receive pathway 102 with transmit pathway 112 in order that device 11 may communicate with port 16. The processes of receiving the request from device 11 or from the applications program or process, processing the request, sending a message to port 16 and establishing the connections between the transmit and receive pathways of device 11 and port 16 are all performed at the centralized location of switch 10.

If switch 10 were to fail, or if the facility wherein switch 10 is located were to incur a power failure, the ability of switch 10 to provide interconnections between the various devices 11, 12 and 13 and ports 14, 15 and 16 would be partly or entirely impaired. This problem would be compounded if the ports have numerous telecommunications extensions attached thereto.

Such a disadvantage is alleviated when, as illustrated by the present invention, the different functions performed by switch 10 are distributed within and among a plurality of remotely located nodes. Then, if less than all of the nodes incur a failure of some type, the network would continue to enjoy some switching capabilities.

Figure 2:
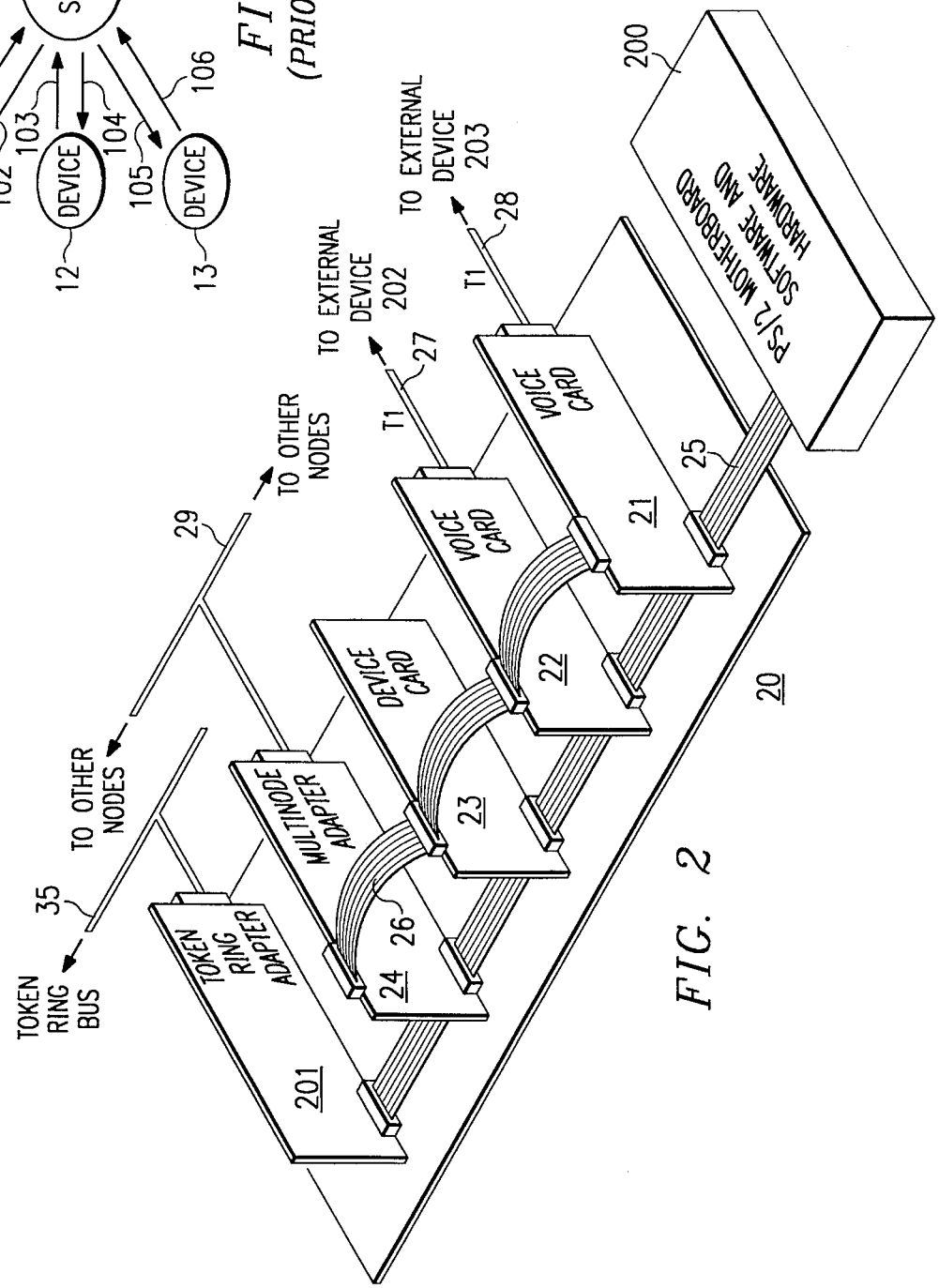
FIG. 2 illustrates a typical implementation of the present invention within a node.
Figure 3:
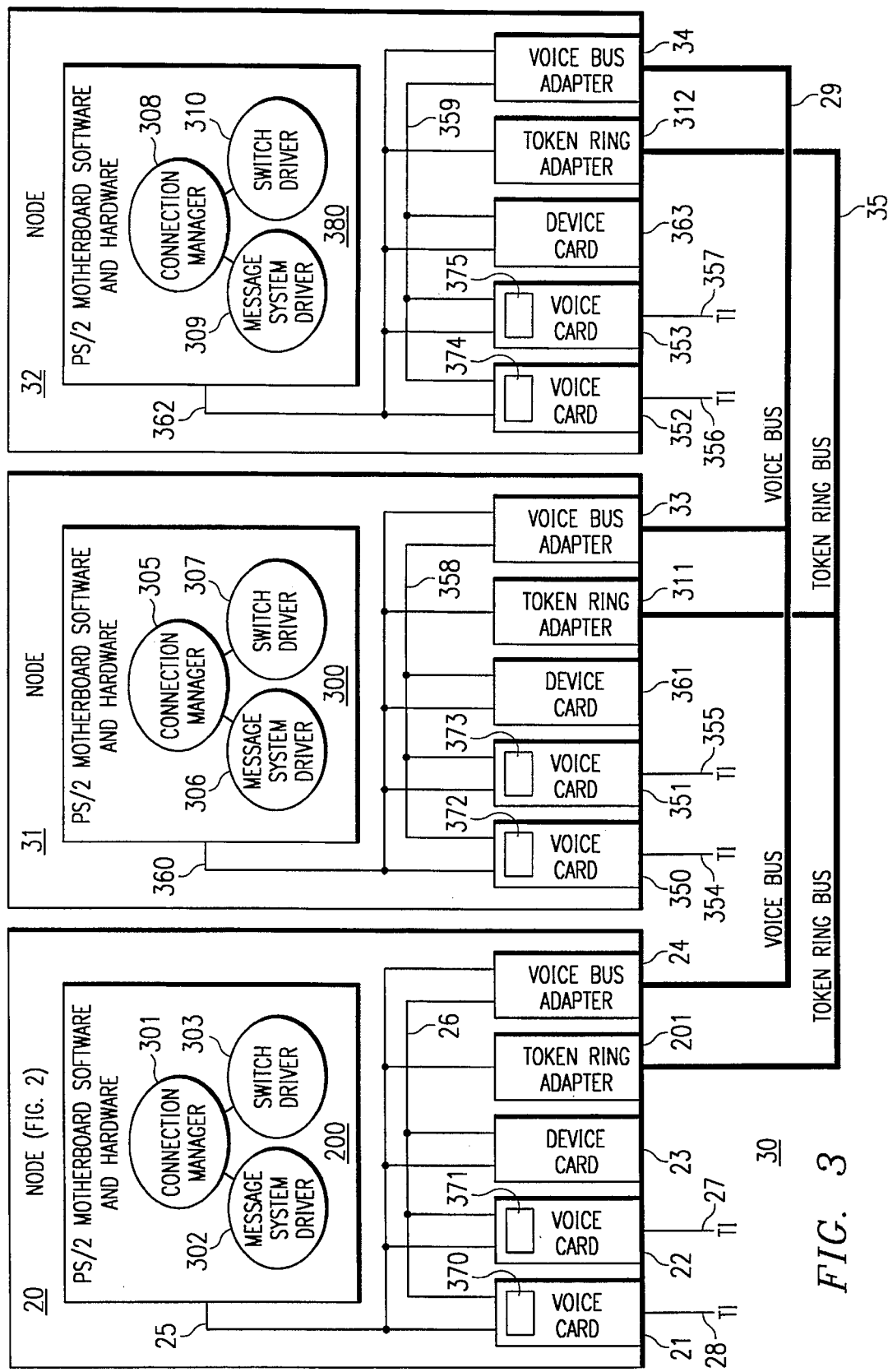
FIG. 3 illustrates a typical implementation of a multinode distributed switching architecture.

Referring next to FIG. 2, there is illustrated typical node 20 within the distributed switching architecture shown in FIG. 3 of the present invention. Node 20 may consist, for example, of PS/2 computer motherboard 200, or other similar computing system, and associated software and hardware connected through data bus 25 to voice cards 21 and 22, device card 23, multinode adaptor 24 and token ring driver 201.

PS/2 computer motherboard 200 may contain one or several applications programs that contain processes for interconnecting ports and devices coupled to node 20. Such applications programs may be contained within an integrated services platform, such as disclosed in U.S. Pat. No. 5,193,110 to Jones et al. referenced above, or within the systems and methods disclosed within co-pending applications Ser. Nos. 08/016,062 and 08/016,740.

Voice cards 21 and 22 receive T1 transmissions from lines 28 and 27 respectively. A T1 transmission line carries a digital data stream operating at a specific frequency with the capability of carrying data or 24 voice channels originating with associated external devices. Such external devices may be telephones, computers or facsimile machines. In FIG. 2, T1 transmission lines 27 and 28 are coupled to external devices 202 and 203 respectively.

T1 transmission lines 27 and 28 may be each coupled to a high bandwidth port on voice cards 22 and 21, respectively, or T1 transmission lines 27 and 28 may be each coupled to 24 ports, which are coupled to voice cards 22 and 21, respectively. Each of the 24 ports coupled to T1 transmission lines 27 and 28 are coupled to the 24 transmit and receive pathways within the 24 voice channels within each T1 line.

The capacity of node 20 as it is configured in FIG. 2 is 48 ports coupled to 48 voice channels over T1 transmission lines 27 and 28, but more or fewer voice cards may be installed within node 20 to vary the capacity. This is dependent upon the capacity of node 20 (PS/2) for accommodating additional boards.

Device card 23, multinode adaptor 24 and token ring driver 201 in conjunction with motherboard 200 permit node 20 to conduct a variety of functions including processing received data and/or incoming telephone calls, determining the location of all ports and devices attached to all nodes within the distributed network that node 20 is attached to (see FIG. 3) and for sending and receiving messages pertaining to connections to be made for linking the various ports and devices in the network.

PS/2 motherboard 200 and printed circuit cards 21, 22, 23, 24 and 201 within node 20 are linked by data bus 25 which provides communications between cards 21, 22, 23, 24, 201 and PS/2 motherboard 200. Cards 21, 22, 23, 24 and 201 within node 20 may be conventional printed circuit boards with mounted integrated chips, each card configured and programmed for a variety of functions.

Additionally, local bus 26 connects cards 21, 22, 23 and 24 together so that there is a pathway for voice data between bus 29, voice cards 21 and 22, device card 23 and T1 transmission lines 27 and 28. Global bus 29 enables devices 202 and 203 to communicate with another port or device connected to another node, as will be discussed with reference to FIG. 3.

If the required capacity for a telecommunications switching system is 48 ports or less, then merely node 20 is adequate to service these ports. In such a case, multinode adapter 24, token ring driver 201, token ring bus 35 and bus 29 are not required since communications with additional nodes is not needed.

The operation of node 20 will first be described for the instance where the ports or devices to be coupled are both associated with node 20. In other words, both devices or ports are in the same local node so that switching can be performed over bus 26 in node 20. An example of the operation of node 20 begins with an external device, such as external device 203 connected through T1 transmission line 28 to a port within voice card 21, wishing to communicate with external device 202 connected through T1 transmission line 27 to a port within voice card 22. External device 203 sends a request for communication with external device 202 over T1 transmission line 28 to node 20 which will be received by voice card 21. Voice card 21 will communicate over bus 25 with motherboard 200 in order to process the request and determine the location of external device 202. The software within motherboard 200 will determine that external device 202 is coupled to T1 transmission line 27 and will send messages over bus 25 to voice card 22 and to voice card 21 so that the transmit channel of the port associated with external device 203 is coupled to the receive channel of the port associated with external device 202 and that the receive channel of the port associated with external device 203 is connected to the transmit channel of the port associated with external device 202, resulting in a two-way communication between external device 203 and external device 202.

Alternatively, when node 20 is utilized as an integrated services system, such as previously described, a person using external device 202 may call in to node 20 through a public switch network (not shown) that is coupled to node 20 via T1 transmission line 27. The call from external device 202 will be received at a port within voice card 22 and processed by the integrated services system residing within PS/2 motherboard 200. An example of a process within motherboard 200 might be an ACD system that will interact with the caller on external device 202 and determine that the caller needs to be connected to an agent residing within an agent pool coupled to node 20. When an agent within the agent pool becomes available, the ACD system will determine which port within voice cards 21 and 22 is coupled to the available agent. In this example, the available agent is utilizing telephone, or external device, 203 coupled to a port within voice card 21. By way of illustration, T1 transmission line 28 may be coupled to a local PBX that is coupled to telephones residing within the agent pool.

Once the ACD system has determined the location of the port within voice card 21 to which external device 203 is coupled, a message will be sent from motherboard 200 to voice cards 21 and 22 to connect the transmit and receive channels associated with the ports coupled to external devices 202 and 203 so that the caller may converse with the available agent. Within this example, if an agent is not immediately available to converse with the caller on external device 202, the ACD system residing within motherboard 200 may send a command to voice card 22 to couple the port associated with external device 202 to device card 23, which contains a process for providing a "hold" message. Thus, the transmit channel of device 23 will be coupled to the receive channel of the node associated with external device 202 so that the caller receives the hold message emanating from the device 23. Then, when an agent becomes available, the connection between device 23 and the port associated with external device 202 will be removed, and the port will be coupled to the port associated with the external device utilized by the next available agent.

For an implementation of a telecommunications system that is not required to service more than 48 external telecommunications devices with a local switching system, the utilization of node 20 is quite sufficient and cost effective. However, if greater capacity is required, several options are available to increase the capacity of such a switching system. For example, voice cards 21 and 22 may be replaced by higher capacity voice cards each capable of receiving more than one T1 transmission line. Alternatively, additional voice cards may be installed within node 20 so that more T1 transmission lines may be received. However, both of these solutions have structural and technological limitations that hinder the ability to increase the capacity of one single node.

Referring to FIG. 3, the solution to the previously described problem is in the implementation of multinode switching architecture 30 having additional nodes 31 and 32, which are similar in structure and function to node 20. The interaction between nodes 20, 31 and 32 is seamless in that the coupling together of ports and devices associated with nodes 20, 31 and 32 is transparent to the ports and devices. To implement network 30, nodes 20, 31 and 32 are supplied with voice bus adapters 24, 33 and 34 respectively, which are interconnected by external voice bus 29.

As previously described, node 20 has T1 transmission lines 27 and 28 coupled to external devices 202 and 203 respectively. Node 31 is coupled through ports to T1 transmission lines 354 and 355, which are coupled to external devices 403 and 404 respectively. T1 transmission lines 354 and 355 are coupled through ports to voice cards 350 and 351. Voice cards 350 and 351 are connected to device card 361 and voice bus adapter 33 via voice bus 358. Voice cards 350 and 351, device card 361, token ring adapter 311 and voice bus adapter 33 are interconnected to PS/2 motherboard 300 via data bus 360.

In node 32, external device 405 is coupled to T1 transmission line 356 and external device 406 is coupled to T1 transmission line 357, which are coupled to ports within voice cards 352 and 353, respectively. Voice cards 352 and 353 are interconnected to device card 363 and voice bus adapter 34 via voice bus 359. Voice cards 352 and 353, device card 363, token ring adapter 312 and voice bus adapter 34 are interconnected to PS/2 motherboard 380 via data bus 362.

Motherboard 200 contains connection manager 301, message system driver 302 and switch driver 303. Likewise, motherboard 300 contains connection manager 305, message system driver 306 and switch driver 307 while motherboard 380 contains connection manager 308, message system driver 309 and switch driver 310.

Additionally, the software and hardware of PS/2 motherboard 200 may contain various applications and processes, such as those associated with an integrated services system as previously described. These applications programs will direct connection managers 301, 305 and 308 to perform various switching functions as required.

The functions of connection manager 301, message system driver 302 and switch driver 303 are contained within the software and hardware of PS/2 motherboard 200, which is coupled to cards 21–24 and 201 via data bus 25. Nodes 31 and 32 are similarly configured.

Connection manager 301 performs the function of receiving requests for connections from applications programs or processes (or from internal and external devices), determining the locations of requested ports and devices and transmitting messages regarding requested connections. Message system driver 302 actually directs the messaging between nodes at the instruction of connection manager 301. Message system driver 302 sends messages to remote nodes through data bus 25 and token ring driver 201.

Switch driver 303, at the direction of connection manager 301, works in conjunction with voice cards 21 and 22 to perform the actual connections of transmit channels to receive channels of devices and ports. All of the aforementioned functions will be detailed with reference to the examples to follow.

Network 30 also includes token ring bus 35 to thereby provide a means for transmitting data and digital messages between nodes 20, 31 and 32. Such data and messaging is transmitted and received by nodes 20, 31 and 32 at token ring adapters 201, 311 and 312 respectively. These messages are primarily switching commands in this example, but may comprise other type messaging as well.

Voice Bus 29 provides a means for transmitting digitized voice between devices and ports coupled to nodes 20, 31 and 32. Bus 29 is attached to multinode adapters 24, 33 and 34 within nodes 20, 31 and 32.

Network 30 illustrates the distribution of the functionality of a distributed switching architecture among the separate nodes within network 30. Each of nodes 20, 31 and 32 has the capability of providing connections between ports and devices separately associated with nodes 20, 31 and 32.

For example, external device 203 connected via T1 transmission line 28 to a port within node 20 may request (or a separate process may initiate) a connection to an external device (not shown) connected via T1 transmission line 357 to a port within node 32. External device 203 may communicate its request for connection through an external interface to this token ring.

Connection manager 301 will receive the request through voice card 21 and bus 25, and in conjunction, make a determination of the location of the external device. This determination is possible since as a node and/or a device is added to network 30, their location within network 30 is transmitted to connection managers 301, 305 and 308 (and the connection manager associated with any added nodes) so that the entire structure and configuration of network 30 and the location of each port and device attached to all nodes within network 30 is known and stored within connection managers 301, 305 and 308.

Consequently, connection manager 301 will be able to determine that the external device is associated with node 32. Connection manager 301 will then cause message system driver 302 to send a message via bus 25 to token ring adapter 201, which is then sent via token ring bus 35 to token ring adapter 312 within node 32 and then to message system driver 309 via bus 362. This message will be received and processed by connection manager 308. Both connection managers 301 and 308 will send messages to switch drivers 303 and 310, respectively, to thereby cause voice cards 21 and 353 to interconnect the transmit and receive channels of the ports associated with device 401 and the external device through bus 29 thereby resulting in device 401 communicating with the external device.

Figure 4A:
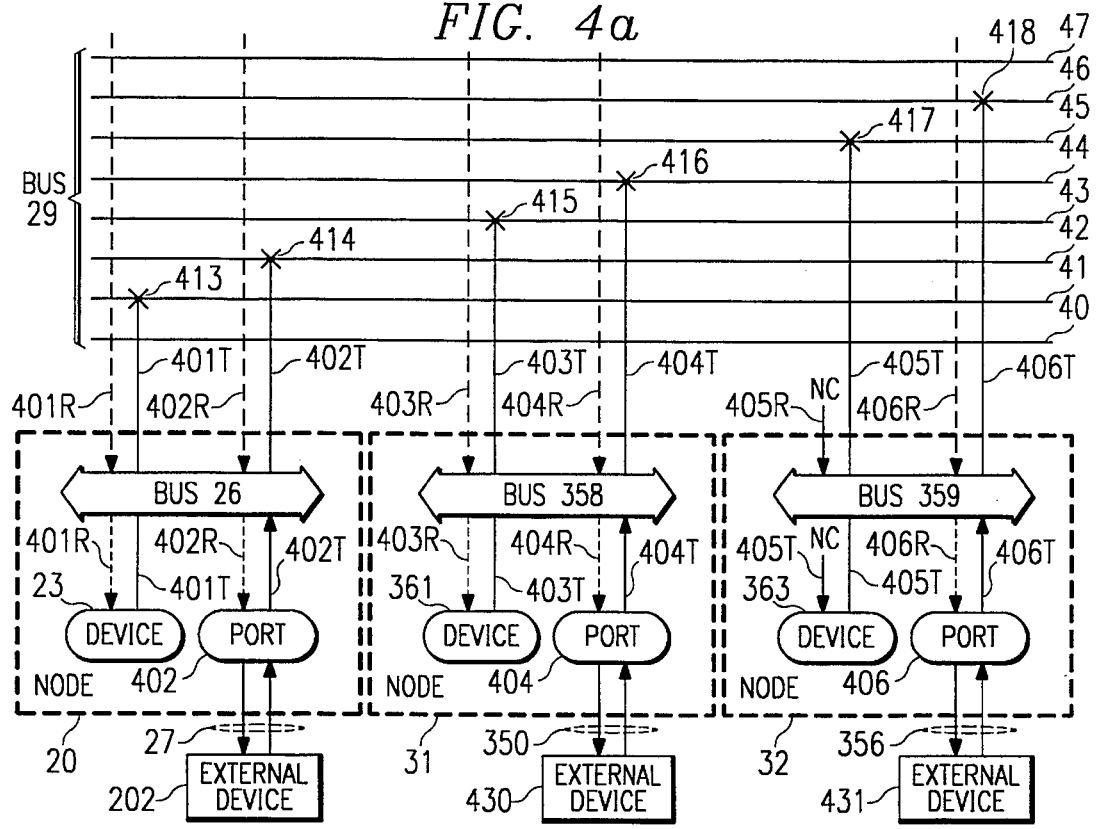
FIGS. 4a and 4b illustrate a global bus configuration utilized within the multinode distributed switching architecture.
Figure 4B:
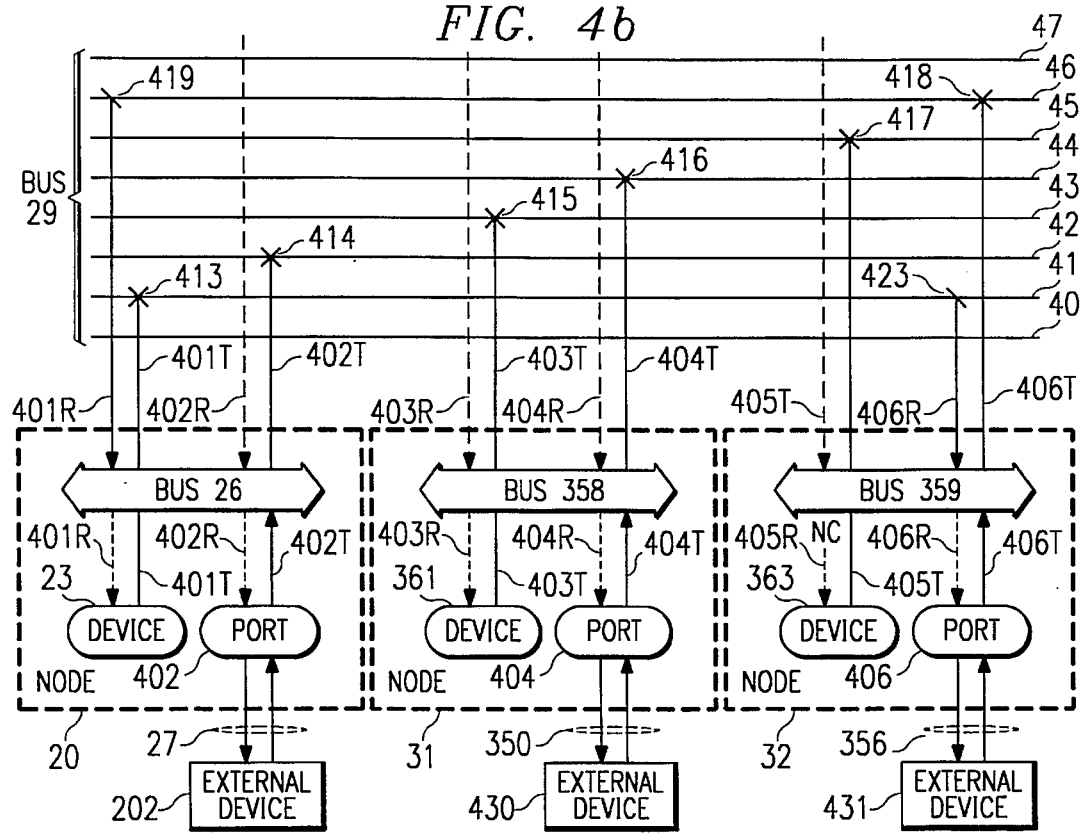

Referring next to FIGS. 4a and 4b, there is illustrated an embodiment of bus 29 according to the present invention. FIG. 4a illustrates bus 29 in a "ready" state prior to any interconnections being made between devices and ports. FIG. 4b illustrates bus 29 after device 23 has been interconnected with port 406 in a manner to be described. As previously described, external device 202 may be coupled to node 20 through T1 line 27 coupled to port 402, external device 430 may be coupled to node 31 through T1 line 350 coupled to port 404 and external device 431 may be coupled to node 32 through T1 line 356 coupled to port 406.

Port 402 within node 20 may be coupled to bus 26 through transmit channel 402T and receive channel 402R. Port 404 may be coupled to bus 358 within node 31 by transmit channel 404T and receive channel 404R. Port 406 within node 32 may be coupled to bus 359 by transmit channel 406T and receive channel 406T.

Similarly, device 23 may be coupled to bus 26 by transmit channel 401T and receive channel 401R; device 361 may be coupled to bus 358 by transmit channel 403T and receive channel 403R; and device 363 may be coupled to bus 359 by transmit channel 405T. Receive channel 405R is not coupled to bus 359.

Local voice buses 26, 358 and 359 are coupled to global voice bus 29 through their respective voice bus adapters 24, 33 and 34, respectively (shown in FIG. 3).

Generally, global bus 29 contains considerably more voice channels than each of local buses 26, 358, 359. For example, global bus 29 may consist of 4,000 voice channels, while buses 26, 358 and 359 may each consist of only 500 voice channels. Thus, the voice channels within buses 26, 358 and 359 each occupy 500 voice channels within the total of 4,000 channels within bus 29.

Bus 29 has illustrated eight separate channels 40–47. Of course, bus 29 may have any number of channels depending upon the actual materials used for constructing bus 29 and their bandwidth capacity. For example, bus 29 may be implemented within a ribbon cable having the capability of transmitting 512 channels via pairs of wires. As an alternative, bus 29 may consist of a fiber optic cable, thereby having a much greater capacity. Also, bus channels 40–47 may be transmission time slots within a digital data stream being transmitted over bus 29. Bus 29 could be expanded almost limitlessly. However, as the capacity of bus 29 is increased, each multinode adaptor may have to be modified or replaced to effectively interface between the larger global bus 29 and the smaller (e.g., 512 channel) local buses 26, 358, 359.

In a preferred embodiment of the present invention, the transmit channels of selected devices and ports connected to nodes 20, 31 and 32 may be permanently assigned a channel within bus 29. For example, transmit channel 401T of device 23 is permanently assigned voice bus channel 41, transmit channel 402T of port 402 is permanently assigned bus channel 42, transmit channel 403T of device 361 is permanently assigned bus channel 43, transmit channel 404T of port 404 is permanently assigned bus channel 44, transmit channel 405T of device 363 is permanently assigned bus channel 45 and transmit channel 406T of port 406 is permanently assigned bus channel 46. These permanent assignments are labeled 413, 414, 415, 416, 417 and 418 respectively.

Connection managers 301, 305 and 308 will each be aware of these permanent assignments. When a new device or node is added to network 30, each connection manager 301, 305 and 308 (and the connection manager associated with the new node or device) may be manually or automatically informed of the addition including any new permanent assignments of transmit channels to bus 29.

Furthermore, receive channels 401R, 402R, 403R, 404R and 406R are allowed to float between every channel (40–47) within bus 29, and thus, may be connected to any channel (40–47) within bus 29 thereby allowing an associated device or port to receive from any other device or port having its transmit channel permanently assigned to a channel within bus 29.

It is not necessary that a device or port have both its transmit and receive channels connected to a bus channel. Thus, a device or port may be a "receive only" or a "transmit only" (see device 363) device or port. For example, in FIG. 4a, receive channels 401R, 402R, 403R, 404R and 406R are presently floating and not assigned to any one of channels 40–47 of bus 29. Note that device 363 is a "transmit only" device in that receive channel 405R is not capable of connection to any of channels 40–47 within bus 29. Device 363 may contain a process for transmitting a "hold" message to a connected caller into system 30, as previously described. The converse is also possible whereby a device or port is a "receive only" telecommunications device.

Furthermore, a plurality of receive channels 401R, 402R, 403R, 404R and 406R may be connected to the same bus channel, which has been permanently assigned a transmit channel, thereby allowing a plurality of devices and/or ports associated with the connected receive channels to receive a transmission from the device or port having its transmit channel permanently assigned the bus channel.

An advantage of the previously described configuration whereby transmit channels are permanently assigned to bus channels is that less "hand shaking" protocol is necessary between nodes 20, 31 and 32 within network 30 since connection managers 301, 305 and 308 within nodes 20, 31 and 32 are aware of each bus channel assignment to the transmit channels of any device or port within network 30. Only one message is required to be sent to a remote node, which is a message telling the remote node to connect the receive channel of the remote device or port associated with the remote node to the bus channel permanently assigned to the transmit channel of the local device or port. This procedure will be further explained.

These connections of receive channels 401R, 402R, 403R, 404R and 406R are initiated by switch drivers 303, 307 and 310 as shown in FIG. 3. Switch drivers 303, 307 and 310 accomplish such connections upon receiving appropriate messaging from respective connection managers 301, 305 and 308. Switch drivers 303, 307 and 310 direct voice bus adaptors 24, 33 and 34 to provide the connections on bus 29.

Referring again to FIG. 4b, a typical connection between remote devices or ports may be described. As an example, device 23 is associated with node 20, and port 406 is associated with node 32. Device 23 may request a connection to port 406 and send such request to node 20 in the manner previously described. The request will be received and processed by connection manager 301 which will make a determination that port 406 is associated with node 32 (see FIGS. 2 and 3 for detail of node 20). Connection manager 301 is able to immediately determine that port 406 is associated with node 32 because of the aforementioned process whereby each connection manager within network 30 is kept apprised of permanent assignments 413–418. Note, if the ports to be connected are both coupled to the same node, then the connection will be made on the boards containing these ports.

If the request from device 23 is for a two-way communication between device 23 and port 406, connection manager 301 will note that port 406 has its transmit channel 406T permanently assigned to bus channel 46 (connection 418). Connection manager 301 will then cause switch driver 303 to connect receive channel 401R of device 23 to channel 46 within bus 29 thereby linking transmit channel 406T of port 406 to receive channel 401R of device 23. A second message is sent by connection manager 301 via message system driver 302 and token ring driver 304 over token ring bus 35 to token ring driver 312 and message system driver 309 within node 32. Connection manager 308 receives the message that device 23 wishes to communicate with port 406 and notes that transmit channel 401T of device 23 is permanently assigned to bus channel 41. Connection manager 308 will cause switch driver 310 to connect receive channel 406R of port 406 to channel 41 of bus 29 thereby linking transmit channel 401T of device 23 to receive channel 406R of port 406. As a result, device 23 is now able to conduct a two-way communication with port 406.

The request to connect device 23 to port 406 may be initiated by a separate process running within one of nodes 20, 31 or 32. For example, if nodes 20, 31 and 32 resided within an integrated services platform, the initiating process may originate with an applications program that has received an external call over T1 line 356 from a caller at external device 431. External device 431 may exist somewhere within a public switched network. The call will be received by port 406 and processed by the integrated services platform. For illustration purposes, a caller may request specific information related to his/her account. The applications program will then request the coupling of port 406 to device 23, since device 23 is able to interact with the caller concerning the caller's account. After the caller has completed interaction with device 23, the connection to the interactive services platform at port 406 may be terminated, or port 406 may then be coupled to other processes.

As can be seen, only one message is required to be sent between node 20 and node 32 since connection managers 301 and 308 are already aware of permanent assignments 413–418. Thus, several levels of "hand shaking" protocol are eliminated since connection managers 301 and 308 do not have to transmit numerous messages to each other concerning which of the bus channels to utilize and to subsequently confirm such utilizations. Such a reduction in "hand shaking" is critical in a telecommunications system when the connections between devices need to be accomplished almost instantaneously.

If the request by the aforementioned process is for a one-way communication whereby port 406 merely listens to the transmission of device 23 (for example, when a "hold" message is played to a caller), the message sent by connection manager 308 to connection manager 301 is not needed. All that is required is that connection manager 308 note that transmission channel 401T of device 23 is permanently assigned to channel 41 of bus 29. Connection manager 308 will then cause switch driver 310 to connect receive channel 406R of port 406 to bus channel 41. It is not required that receive channel 401R of device 23 be connected to transmit channel 406T of port 406.

In such a case, if port 404 associated with node 31 also wishes to receive the transmission of device 23, a request will be sent by a resident process to connection manager 305, which will note permanent assignment 413 of transmit channel 401T on bus channel 41, and therefore send a message to switch driver 307 to connect receive channel 404R of port 404 to bus channel 41.

Such a "broadcast" configuration may be the result of two external callers within a public switched network, calling from external devices 430 and 431 to ports 404 and 406, desiring to listen to a prerecorded speech, or lecture, at a specific time, that is resident within device 23.

As can be seen, many permutations of the above-described connections may be accomplished by switching network 30, such as conferencing between several devices. It should also be noted that an optional configuration may be to permanently assign receive channels of selected devices and ports and allow their transmit channels to float among channels 40–47 of bus 29 in a manner similar to the operation previously described.

Referring next to FIG. 6, there is shown an embodiment of bus 26 within node 20. Nodes 31 and 32 may be similarly configured. As previously described, the present invention distributes the switching functions within and among individual nodes. In other words, a central switch is not required to connect ports and devices associated with a particular node, or even to connect ports and devices associated with a plurality of nodes. Essentially, the functions of a central switch have been distributed within and among the nodes.

FIGS. 4a and 4b illustrate the second level of switching (on bus 29 utilizing multinode adaptors 24, 33 and 34) that occurs at nodes that are associated with ports or devices that are being interconnected. FIG. 6 illustrates the first level of switching (within the voice cards contained within each node) that occurs when the ports and/or devices are all associated with a single node. This first level of switching has been previously described with respect to FIG. 2.

Figure 6A:
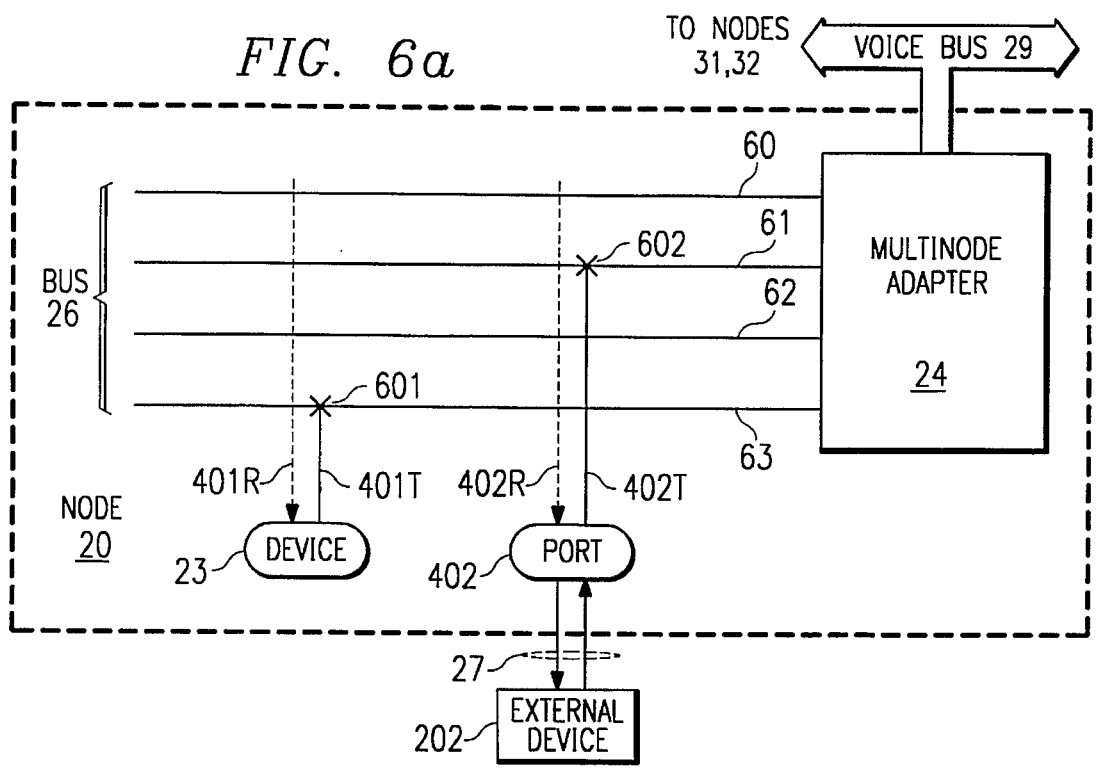
FIGS. 6a and 6b illustrate a local bus configuration utilized within the distributed switching architecture.

As in FIGS. 4a and 4b, FIG. 6a illustrates the preferred embodiment of the invention whereby the transmit channels of ports and devices are permanently connected to channels within local bus 26. For purposes of illustration only, voice channels 60–63 of bus 26 are only illustrated. Of course, many more voice channels may be contained within bus 26. Device 23 has its transmit channel 401T permanently attached to voice channel 63 within bus 26, labeled as connection 601. Receive channel 401R of device 23 is allowed to float between all of the voice channels 60–63 of bus 26. Transmit channel 402T of port 402 is permanently connected to voice channel 61, labeled as connection 602. Receive channel 402R of port 402 is allowed to float between channels 60–63 of bus 26.

As previously described, multinode adapter 24 provides an interface between local bus 26 and global bus 29 whereby voice channels 60–63 are allocated for voice channels on bus 29.

Figure 6B:
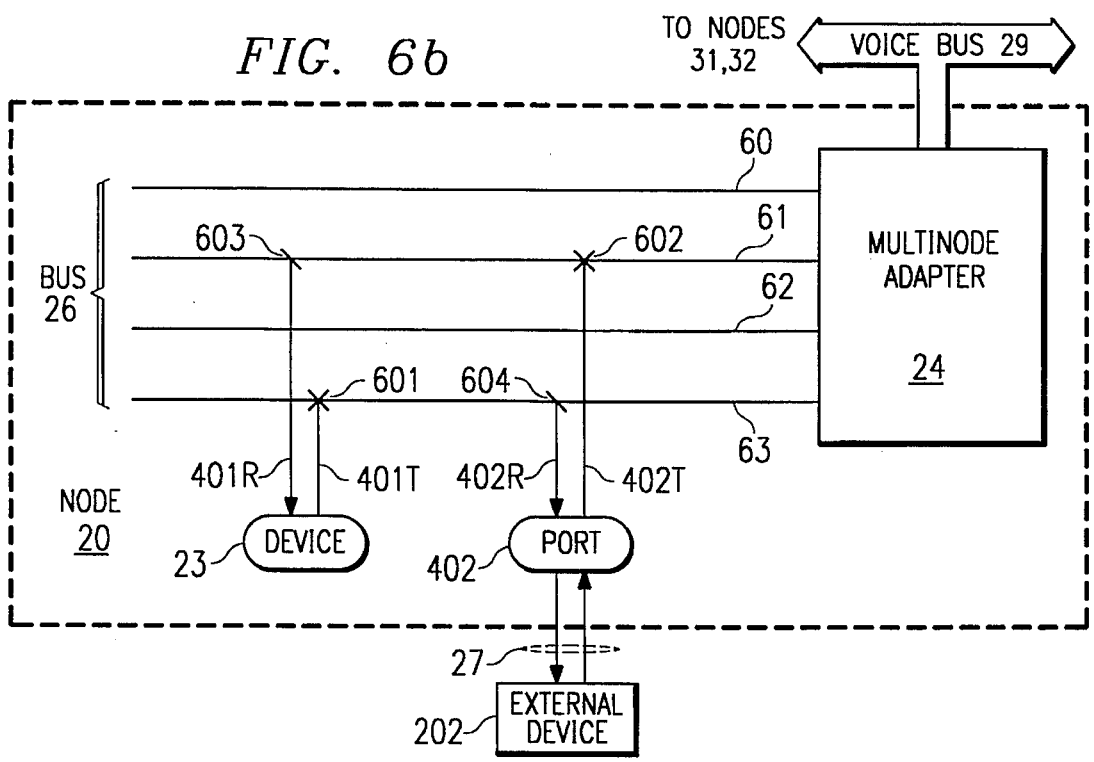

Referring next to FIG. 6b, there is illustrated the connections upon bus 26 that are implemented when a process within node 20 couples device 23 to port 402. In such a situation, receive channel 401R of device 23 will be temporarily connected to voice channel 61 so that device 23 may listen to the transmit of port 402. Likewise, receive channel 402R of port 402 will be temporarily connected to voice channel 63, labeled as connection 602, so that port 402 may listen to the transmit of device 23. Thus, a first level of switching is accomplished within node 20, as opposed to prior art configurations whereby the connections would be required to be made within a central switch that interconnects all of the ports and devices coupled to individual nodes 20, 31 and 32.

Referring back to FIG. 3, essentially first levels of distributed switching are accomplished within each of nodes 20, 31 and 32 by switching means 370–375 (within the voice cards) when the connections are only required to be made between devices and/or ports associated with one node. A second level of distributed switching is performed within the nodes that are associated with ports and/or devices that are all not located within one node. However, even during this second level of switching, the switching functions are distributed within each of the relevant nodes at their respective multinode adapters.

If network 30 continues to grow to the point that bus 29 is not capable of handling all of the ports and devices connected to the various nodes, a combination distributed and centralized switching system may be utilized as illustrated in FIG. 5. In FIG. 5, bus 29 has a limited capacity and is thus unable to handle all of the ports and devices connected to nodes 20, 31, 32, 53, 54 and 55. Thus, the addition of bus 52 is needed to handle the overflow.

In network 50, bus 29 interconnects nodes 20, 31 and 32 and bus 52 interconnects nodes 53, 54 and 55. Switching between ports and devices associated with nodes 20, 31 and 32 via bus 29 is accomplished as previously described. Additionally, interconnections between ports and devices associated with nodes 53, 54 and 55 via bus 52 are also accomplished in the manner previously described. However, if ports or devices associated with nodes connected to bus 29 wish to communicate with ports or devices associated with nodes interconnected via bus 52, such switching interconnections must be accomplished by centralized hub switch 51 linking buses 29 and 52. Thus, if a port or device associated with node 20 wishes to communicate with a port or device associated with node 53, hub switch 51 will be required to couple the bus channel assigned to the transmit channel of the first port or device to the bus channel assigned to the receive channel of the second port or device and vice versa.

Token ring bus 35 may again be utilized to provide messaging between nodes 20, 31, 32, 53, 54 and 55 of network 50. Since token ring bus 35 is simply a digital data bus that periodically sends messages between the various nodes, only one token ring bus is required to interconnect all of the nodes.

An alternative to hub switch 51 is to install a larger bus between all of the nodes, or a plurality of buses, and enhancing the multinode adaptors as previously described herein.

Although the present invention and its advantages have been described in detail, it should be understood that various changes, substitutions and alterations can be made herein without departing from the spirit and scope of the invention as defined by the appended claims.

What is claimed is:

1. A distributed telecommunications switching system for linking a first port having separate transmit and receive channels to a second port having separate transmit and receive channels, said first and second ports being telecommunications ports, said switching system comprising:

a bus connected between said first port and said second port wherein said transmit channel of said first port and said transmit channel of said second port are permanently assigned to exclusive transmission slots within said bus and said receive channels of said first and second ports are assignable to a slot selected from any of said permanently assigned transmission slots within said bus;

means for receiving a command to link said first port to said second port;

means for instructing a coupling of said receiver of said second port to said transmission slot within said bus that is permanently assigned to said transmit channel of said first port in response to said command; and means for coupling said receiver of said second port to said transmission slot within said bus that is permanently assigned to said transmit channel of said first port in response to said instructing means.

2. The system as recited in claim 1 further comprising:

second means for instructing a coupling of said receiver of said first port to said transmission slot within said bus that is permanently assigned to said transmit channel of said second port in response to said command; and second means for coupling said receiver of said first port to said transmission slot within said bus that is permanently assigned to said transmit channel of said second port in response to said second instructing means.

3. The system as recited in claim 1 wherein said instructing means further comprises:

means for processing said command; and means, residing coextensively with said processing means, for formulating a message to be sent to said coupling means, said message instructing said coupling means to couple said receiver of said second port to said transmission slot within said bus that is permanently assigned to said transmit channel of said first port in response to said command.

4. The system as recited in claim 3, further comprising:

means for transferring said message.

5. The system as recited in claim 4 where said transferring means further comprises:

a token-ring bus connected between said processing means and said coupling means for transferring said message.

6. The system as recited in claim 2 wherein said second instructing means further comprises:

means for processing said command; and means, residing coextensively with said processing means, for formulating a message to be sent to said second coupling means, said message instructing said second coupling means to couple said receiver of said first port to said transmission slot within said bus that is permanently assigned to said transmit channel of said second port in response to said command.

7. The system as recited in claim 3 wherein said first port is associated with a first system node that transmits and receives telecommunication signals from said first port.

8. The system as recited in claim 7 wherein said receiving means and said processing and formulating means are located coextensively with said first system node.

9. The system as recited in claim 2 wherein said first port is associated with a first system node that transmits and receives telecommunication signals from said first port.

10. The system as recited in claim 9 wherein said processing and formulating means and said second coupling means are located coextensively with said first system node.

11. The system as recited in claim 1 wherein said second port is associated with a second system node that transmits and receives telecommunication signal from said second port.

12. The system as recited in claim 11 wherein said coupling means is located coextensively with said second system node.

13. The system as recited in claim 1 wherein said first port is a computer port.

14. The system as recited in claim 1 wherein said bus is a digital data stream operating at a preselected baud rate and wherein said transmission slots are multiplexed time slots within said data stream.

15. The system as recited in claim 1 wherein said command is a request received from said first port.

16. The system as recited in claim 1 wherein said command is received from a separate process coupled to said system.

17. A distributed telecommunications switching system for linking a plurality of ports, said ports being telecommunications ports, said system comprising:

a bus linking said plurality of ports, wherein preselected transmitting channels of said ports are permanently assigned to transmission slots within said bus and preselected receiving channels of said ports are assignable to any transmission slot within said bus;

means for receiving a command to link a first of said ports to a second of said ports; and means for linking said first port to said second port via said bus in response to said command.

18. The system as recited in claim 17 wherein said command is for a two-way communication between said first and second ports, and wherein a first transmitting channel of said first port and a second transmitting channel of said second port have been permanently assigned first and second transmission slots, respectively, within said bus, and said linking means further comprises:

first means for instructing a receiving channel of said second port to couple to said first transmission slot in response to said command;

second means for instructing a receiving channel of said first port to couple to said second transmission slot in response to said command;

first means for coupling said receiving channel of said first port to said second transmission slot in response to said second instructing means; and second means for coupling said receiving channel of said second port to said first transmission slot in response to said first instructing means.

19. The system as recited in claim 17 wherein said first and second instructing means further comprises:

means for processing said command;

means, residing coextensively within said processing means, for formulating a first message to be sent to said first coupling means, said first message instructing said first coupling means to couple said receiving channel of said first port to said second transmission slot in response to said command; and means, residing coextensively with said processing means, for formulating a second message to be sent to said second coupling means, said second message instructing said second coupling means to couple said receiving channel of said second port to said first transmission slot in response to said command.

20. The system as recited in claim 19, further comprising:

means for transferring said second message.

21. The system as recited in claim 20 wherein said transferring means further comprises:

a token-ring bus connected between said processing means and said second coupling means for transferring said second message.

22. The system as recited in claim 17 wherein said command is for a one-way communication between said first and second ports, and wherein a transmitting channel of said second port has been permanently assigned to a transmission slot within said bus, and said linking means further comprises:

means for instructing a receiving channel of said first port to couple to said transmission slot in response to said command; and means for coupling said receiving channel of said first port to said transmission slot in response to said instructing means.

23. The system as recited in claim 22 wherein said instructing means further comprises:

means for processing said command; and means, residing coextensively with said processing means, for formulating a message to be sent to said coupling means, said message instructing said coupling means to couple said receiving channel of said first port to said transmission slot in response to said command.

24. The system as recited in claim 17 wherein said command is a request received from said first port.

25. The system as recited in claim 17 wherein said command is received from a separate process coupled to said system.

26. A method for processing a request within a distributed telecommunications switching system to link a first port having separate transmit and receive channels to a second port having separate transmit and receive channels, said first and second ports being telecommunications ports, said method comprising the steps of:

coupling a bus between said first port and said second port wherein said transmit channel of said first port and said transmit channel of said second port are permanently assigned to separate transmission slots within said bus and said receive channels of said first and second ports are temporarily assignable to any of the transmission slots within said bus; and coupling said receive channel of said second port to said transmission slot within said bus that is permanently assigned to said transmit channel of said first port in response to said request.

27. The method as recited in claim 26 further comprising the step of:

connecting said receive channel of said first port in response to said request, to said transmission slot within said bus that is permanently assigned to said transmit channel of said second port.

28. The method as recited in claim 26 wherein said coupling step further comprises the steps of:

processing said request; and formulating a message in response to said request, said message instructing said coupling of said receive channel of said second port to said transmission slot within said bus that is permanently assigned to said transmit channel of said first port.

29. The method as recited in claim 26 wherein said coupling step further comprises the steps of:

processing said request; and formulating a message in response to said request, said message instructing said connecting of said receive channel of said first port to said transmission slot within said bus that is permanently assigned to said transmit channel of said second port.

30. The method as recited in claim 28 wherein said processing and formulating steps are performed within a first system node associated with said first port, wherein said first system node transmits and receives telecommunications signals from said first port.

31. The method as recited in claim 28 wherein said coupling step is performed within a second remote system node associated with said second port, wherein said second system node transmits and receives telecommunications signals from said second port.

32. The method as recited in claim 26 wherein said bus is a digital data stream operating at a preselected baud rate and wherein said transmission slots are multiplexed time slots.

33. A method for linking a plurality of ports in a distributed telecommunications switching system, said ports being telecommunications ports, wherein a bus is coupled between said plurality of ports and wherein preselected transmitting channels of said ports are permanently assigned to transmission slots within said bus and preselected receiving channels of said ports are assignable to any transmission slot within said bus, said method comprising the steps of:

receiving a command to link a first of said ports to a second of said ports; and linking said first port to said second port via said bus in response to said command.

34. The method as recited in claim 33 wherein said command is for a two-way communication between said first and second ports wherein a first transmitting channel of said first port and a second transmitting channel of said second port have been permanently assigned first and second transmission slots, respectively, and said linking step further comprises the steps of:

instructing a receiving channel of said second port to couple to said first transmission slot in response to said command; and instructing a receiving channel of said first port to couple to said second transmission slot in response to said command.

35. The method as recited in claim 34 wherein said instructing steps further comprise the steps of:

processing said command;

formulating a first message, in response to said command, said first message instructing a coupling of said receiving channel of said first port to said second transmission slot;

formulating a second message, in response to said command, said second message instructing a coupling of said second port to said first transmission slot;

coupling said receiving channel of said first port to said second transmission slot in response to said first message; and coupling said receiving channel of said second port to said first transmission slot in response to said second message.

36. The method as recited in claim 33 wherein said command is for a one-way communication between said first and second ports wherein a transmitting channel of said second port has been permanently assigned to a transmission slot within said bus, and said linking step further comprises the step of:

instructing a receiving channel of said first port to couple to said transmission slot in response to said command.

37. The method as recited in claim 36 wherein said instructing step further comprises the steps of:

processing said command;

formulating a message, in response to said command, said message instructing a coupling of said receiving channel of said first port to said transmission slot; and coupling said receiving channel of said first port to said transmission slot.

38. The system as recited in claim 33 wherein said command is a request received from said first port.

39. The system as recited in claim 33 wherein said command is received from a separate process coupled to said system.

40. A distributed telecommunications switching system for linking a first port associated with a first system node to a second port associated with a second system node, said first and second ports being telecommunications ports and having separate transmit and receive channels, said switching system comprising:

- a bus connected between said first system node and said second system node wherein said transmit channel of said first port and said transmit channel of said second port are permanently assigned to separate transmission slots within said bus and said receive channels of said first and second ports are assignable to any of the transmission slots within said bus, and wherein said bus is a digital data stream operating at a preselected baud rate and wherein said transmission slots are multiplexed time slots within said data stream;
- means, located coextensively with said first system node, for receiving a request from said first port to be linked to said second port;
- means, located coextensively with said first system node, for processing said request;
- first means, located coextensively with said second system node, for coupling said receiver of said second port to said transmission slot within said bus that is permanently assigned to said transmit channel of said first port;
- first means, residing coextensively with said processing means, for formulating a message to be sent to said coupling means, said message instructing said coupling means to couple said receiver of said second port to said transmission slot within said bus that is permanently assigned to said transmit channel of said first port in response to said request;
- second means, located coextensively with said first system node, for coupling said receiver of said first port to said transmission slot within said bus that is permanently assigned to said transmit channel of said second port;
- means, residing coextensively with said processing means, for formulating a message to be sent to said second coupling means, said message instructing said second coupling means to couple said receiver of said first port to said transmission slot within said bus that is permanently assigned to said transmit channel of said second port in response to said request; and
- a token-ring bus connected between said first node and said second node for transferring said message.

41. The system as recited in claim 40 wherein said first system node transmits and receives telecommunication signals from said first port.

42. The system as recited in claim 40 wherein said second system node transmits and receives telecommunication signal from said second port.

\* \* \* \* \*